(12) United States Patent
Katahira et al.

(10) Patent No.: US 11,820,408 B2
(45) Date of Patent: Nov. 21, 2023

(54) BOGIE AND GUIDEWAY VEHICLE

(71) Applicant: MITSUBISHI HEAVY INDUSTRIES ENGINEERING, LTD., Yokohama (JP)

(72) Inventors: Kousuke Katahira, Yokohama (JP); So Tamura, Yokohama (JP)

(73) Assignee: MITSUBISHI HEAVY INDUSTRIES ENGINEERING, LTD., Yokohama (JP)

( * ) Notice: Subject to any disclaimer, the term of this patent is extended or adjusted under 35 U.S.C. 154(b) by 709 days.

(21) Appl. No.: 16/965,075

(22) PCT Filed: Jun. 14, 2018

(86) PCT No.: PCT/JP2018/022737
§ 371 (c)(1),
(2) Date: Jul. 27, 2020

(87) PCT Pub. No.: WO2019/163153
PCT Pub. Date: Aug. 29, 2019

(65) Prior Publication Data
US 2021/0107534 A1    Apr. 15, 2021

(30) Foreign Application Priority Data

Feb. 23, 2018    (JP) ................................ 2018-031027

(51) Int. Cl.
*B61F 5/38* (2006.01)
(52) U.S. Cl.
CPC ..................................... *B61F 5/38* (2013.01)
(58) Field of Classification Search
CPC ...... B61F 3/00; B61F 3/02; B61F 3/04; B61F 5/38; B61F 5/44; B61F 5/50; B61F 5/52
See application file for complete search history.

(56) References Cited

U.S. PATENT DOCUMENTS

| 6,477,963 B1 | 11/2002 | Weule et al. |
| 2015/0314796 A1 | 11/2015 | Maeyama et al. |

(Continued)

FOREIGN PATENT DOCUMENTS

| JP | H04-173471 A | 6/1992 |
| JP | 2012-172463 A | 9/2012 |

(Continued)

OTHER PUBLICATIONS

PCT/ISA/210, "International Search Report for International Application No. PCT/JP2018/022737," dated Aug. 21, 2018.

(Continued)

*Primary Examiner* — Robert J McCarry, Jr.
(74) *Attorney, Agent, or Firm* — Manabu Kanesaka; Benjamin Hauptman; Kenneth Berner

(57) ABSTRACT

The bogie includes: running wheels to be rolled on a road surface of guideway; an axle which is installed on a lower part of a body of a guideway vehicle and to which the running wheels are attached; a chassis supporting the axle; a guide device which is configured to be guided by the guideway and is installed on the chassis so as to be capable of turning around a turning axis extending in a vertical direction; a steering device which is configured to steer the running wheels in response to a turning movement of the guide device when the guide device is turned along a curved section of the guideway; and a tilting device which is connected to the guide device and which is configured to generate a tilting force of directing one side of the body located at an outside of the curved section upward with respect to the other side of the body located at an inside of the curved section in response to the turning movement of the guide device.

6 Claims, 10 Drawing Sheets

(56) References Cited

U.S. PATENT DOCUMENTS

2015/0353104 A1 12/2015 Maeyama et al.
2016/0264156 A1 9/2016 Yanobu et al.

FOREIGN PATENT DOCUMENTS

| JP | 2014-144710 A | | 8/2014 | |
|----|---------------|---|--------|---------|
| JP | 2014144710 A | * | 8/2014 | ............... B61F 5/22 |
| JP | 2015-101312 A | | 6/2015 | |
| WO | 2014/118880 A1 | | 8/2014 | |
| WO | 2014/128889 A1 | | 8/2014 | |

OTHER PUBLICATIONS

PCT/ISA/237, "Written Opinion of the International Searching Authority for International Application No. PCT/JP2018/022737," dated Aug. 21, 2018.

* cited by examiner

BOGIE AND GUIDEWAY VEHICLE

TECHNICAL FIELD

The present invention relates to a bogie and a guideway vehicle including the same.

Priority is claimed on Japanese Patent Application No. 2018-031027, filed Feb. 23, 2018, the content of which is incorporated herein by reference.

BACKGROUND ART

As a new transportation method other than a bus or a railway, a guideway transportation system having wheels made of rubber tires or the like running on a guideway is known. This type of guideway transportation system is generally called a "new transportation system" and guide wheels arranged on both sides of a vehicle or the like are guided by guide rails provided along the guideway.

Specific examples of this new transportation system include, for example, Automated People Mover (APM) and Automated Guideway Transit (AGT) for cities.

Incidentally, in railway vehicles, for example, a bogie equipped with a vehicle body tilting mechanism described in Patent Document 1 is known. By using this type of bogie, the vehicle body can be tilted toward the inside of a curved section of a rail way when the vehicle passes through the curved section. As a result, it is possible to run on a curved section at a high speed while improving a ride comfort of a passenger on the curved section by canceling out an excessive centrifugal force generated when the vehicle passes through the curved section. In the railway vehicles, various vehicle body tilting mechanisms are known in addition to the type of the vehicle body tilting mechanism described in Patent Document 1.

CITATION LIST

Patent Document

Patent Document 1: Japanese Unexamined Patent Application, First Publication No. H04-173471

SUMMARY OF INVENTION

Technical Problem

Currently, there is a similar increasing demand for high-speed running also in the above-described APM and AGT.

Here, an object of the present invention is to provide a bogie capable of rapidly running on a curved section of a guideway while improving a ride comfort of a passenger at the curved section in a new transportation system guided by the guideway at the time of running and a guideway vehicle including the bogie.

Solution to Problem

A bogie of a first aspect of the present invention includes: running wheels to be rolled on a road surface of guideway; an axle which is installed on a lower part of a body of a guideway vehicle and to which the running wheels are attached; a chassis supporting the axle; a guide device which is configured to be guided by the guideway and is installed on the chassis so as to be capable of turning around a turning axis extending in a vertical direction; a steering device which is configured to steer the running wheels in response to a turning movement of the guide device when the guide device is turned along a curved section of the guideway; and a tilting device which is connected to the guide device and which is configured to generate a tilting force of directing one side of the body located at an outside of the curved section upward with respect to the other side of the body located at an inside of the curved section in response to the turning movement of the guide device.

In the above-described aspect, the guide device is turned along the curved section of the guideway so that the running wheels are steered. Accordingly, the bogie can run on the curved section. Then, one side of the body at the outside of the curved section is directed upward accordance with the turning movement of the guide device, using a mechanical configuration which is the tilting device connected to the guide device, thereby the body of the vehicle can be tilted toward an inside of the curved section in a width direction of the bogie. Thus, a centrifugal force generated while the guideway vehicle runs on the curved section can be cancelled out by tilting the vehicle body.

Further, in the bogie of the above-described aspect, the bogie may include a bolster spring supporting the body of the guideway vehicle from below. Also, the tilting device may include: a bolster spring receiver supporting the bolster spring from below; a pair of hanging link members each of which is installed such that an upper portion of the first hanging link member is connected to one of the axle and the bolster spring receiver with being capable of rotating around a first rotation axis extending in a running direction of the guideway vehicle, and a lower portion of the first hanging link member is connected to the other of the axle and the bolster spring receiver with being capable of rotating around a second axis extending on the running direction of the guideway vehicle, wherein the pair of the first hanging link members are separated away from each other in a width direction of the bogie and are inclined such that a distance between the first hanging link members in the width direction is increased toward a bottom of the bogie from a top; and a tilt guide member through which the guide device is connected to the body and which is configured to be capable of generating the tilting force by transmitting a turning force of the guide device to the body as a force directed in the width direction at a connection portion between the guide device and the body.

While the guideway vehicle runs on the curved section, some of the turning force of the guide device is transmitted to the body of the guideway vehicle by the tilt guide member so that the vehicle body is pushed or pulled toward the outside of the curved section. At this time, the bolster spring receiver is moved toward the outside of the curved section in the width direction via the bolster spring as similar to the body of the guideway vehicle. Then, the lower portions of the pair of hanging link members connected to the bolster spring receiver are also moved toward the outside of the curved section in the width direction in accordance with the movement of the bolster spring receiver. Since the pair of hanging link members are inclined downward so as to be away from each other in the width direction of the bogie, when the lower portion of one of the hanging link members, which is located at the inside of the curved section, moves toward the outside of the curved section, the lower portion of the hanging link member moves downward. On the other hand, when the lower portion of the other of the hanging link member, which is located at the outside of the curved section, moves toward the outside of the curved section, the lower portion of the hanging link member moves upward. As a result, one portion of the bolster spring receiver at the outside of the curved section is raised to be higher than the other portion of the bolster spring receiver at the inside of the curved section, thereby the body of the guideway vehicle can be also tilted so that one side of the body located at the outside of the curved section is raised with respect to the other side of the body located at the inside of the curved section. In this way, since an operation in which the tilt guide member pushes and pulls the body of the guideway vehicle can make the body be tilted, it is possible to tilt the body of the guideway vehicle with only the hanging link member in response to the turning movement of the guide device.

Further, when the guideway vehicle enters the straight section of the guideway from the curved section of the guideway, the guide device goes back to a regular condition while running along the straight portion. At this time, since the tilt guide member is configured to connect the body of the guideway vehicle to the guide device, the tilt guide member is pulled or pushed by the guide device. Accordingly a force is applied to the body of the guideway vehicle so as to go back the tilted body to the regular condition in which the body is not tilted. Therefore, after the guideway vehicle passed through the curved section, the body of the guideway vehicle can promptly go back to the regular condition and thereby the ride comfort of the guideway vehicle can be improved.

Further, in the above-described aspect, the tilt guide member may include a rod portion which is connected to one of the body of the guideway vehicle and the guide device, a rod support portion supporting the rod portion so as to be relatively movable in a direction of the rod portion and which is connected to the other of the body and the guide device, and an elastic member which is installed in the rod support portion and which is configured to apply a force to the rod portion so as to bring the body and the guide device into a former relative position thereof when the guide device is turned.

Before the vehicle enters to the curved section of the guideway or after the vehicle has passed through the curved section, the body of the guideway vehicle automatically goes back to the regular condition in which the body is not tilted due to the force applied by the elastic member. Thus, it is possible to prevent the body of the guideway vehicle from being kept in the tilted condition even after the guideway vehicle has passed through the curved section.

Further, even when the great turning force of the guide device acts on the body of the guideway vehicle, it is possible to prevent the body from being tilted more than necessary due to a deformation of the elastic member.

Further, even if the guide device moves in small steps due to the vibration generated when the vehicle runs on the straight portion, it is possible to prevent the guide device from intended turning due to the force of the elastic member (the elastic force). Therefore, it is possible to prevent the body of the guideway vehicle from being suddenly tilted at a position of the guideway other than the curved section by appropriately setting the elastic force of the elastic member.

Further, in the above-described aspect, the tilt guide member may be configured to connect the guide device to a suspension frame installed on the body of the guideway vehicle so as to connect the chassis to the body.

In this way, since the body of the guideway vehicle can be tilted by transmitting the turning force of the guide device to the body using the originally provided suspension frame, it is possible to minimize the addition of components to the bogie accompanying the addition of the body of the guideway vehicle tilting function and to tilt the body with a simpler structure.

Further, in the above-described aspect, the bogie may further include: a pair of air springs which are separated away from each other in a width direction of the bogie and which support the body of the guideway vehicle from below as the bolster spring; and height adjustment valves which are configured to supply air to the air springs and discharge air from the air springs. Also, the tilting device may include a second hanging link member which is connected to the guide device and which is supported such that one end portion of the second hanging link member located at an outside of the curved section is raised upward with respect to the other end portion of the second hanging link member located at an inside of the curved section in response to the turning movement of the guide device; and a pair of adjusting rods which are installed such that one of the adjusting rods connects one end portion of the second hanging link member to one of the height adjustment valves and the other connects the other end portion of the second hanging link member to the other of the height adjustment valves, wherein air is supplied to the air spring via the height adjustment valve when the adjusting rod is raised, the air is discharged from the air spring via the height adjustment valve when the adjusting rod is lowered.

In this way, since the hanging link member is tilted in the width direction in response to the turning movement of the guide device, the height of the air spring can be adjusted by using the height adjustment valve. Thus, the body of the guideway vehicle can be tilted by a mechanical configuration called the hanging link member connected to the guide device. Thus, it is possible to cancel out a centrifugal force generated when running on the curved section by tilting the body.

Furthermore, in the above-described aspect, the axle may include attachment shafts which are configured to allow the running wheels to be attached thereto and to rotate around a center axis in the vertical direction corresponding to a steering axis of the running wheels along with the running wheels. Also, the steering device may include a pair of steering arms extending from the attachment shaft in the running direction and which are each rotatable around the center axis of the attachment shaft in accordance with the steering of the running wheels, and a steering rod which is configured to connect each of the steering arms to the connection portion of the guide device and is rotatable around the center axis in the vertical direction with respect to the guide device and the steering arm, wherein a distance between the turning axis and the connection portion in the running direction is longer than a length of the steering arm.

With such a configuration, the running wheels can be steered by a greater amount compared to a case in which the distance between the turning axis and the connection portion is about the same as the length of the steering arm. That is, the steering rod can be moved by a greater amount toward the inside of the curved section in response to the turning movement of the guide device, so that the running wheels can be steered by a greater amount. As a result, it is possible to generate a cornering force between the road surface and the running wheels by steering the running wheels further than the position tangential to the curved section so that the running wheels has a slip angle. As a result, it is possible to reduce a reaction force received by the guide device from the guideway by the high-speed running using the tilting of the body of the guideway vehicle. Thus, since there is no need to increase the durability of the guide device, an increase in size or the like of the guide device can be prevented.

Further, a guideway vehicle of a second aspect of the present invention includes; the bogie of the above-described aspect; and a body which is supported from below by the bogie.

In this way, since the guideway vehicle includes the bogie of the above-described aspect, the body of the vehicle can be tilted using a mechanical configuration called the tilting device connected to the guide device by raising the body on the outside of the curved section with respect to the inside thereof so that the body is directed to the inside of the curved section in accordance with the turning movement of the guide device. Thus, it is possible to cancel out a centrifugal force generated when running on the curved section by tilting the body.

Advantageous Effects of Invention

According to the bogie and the guideway vehicle described above, it is possible to run on the curved section at a high speed while improving the ride comfort of the passenger at the curved section in the guideway transportation system guided by the guideway at the time of running.

DESCRIPTION OF EMBODIMENTS

First Embodiment

A guideway vehicle 1 according to a first embodiment of the present invention will be described with reference to the drawings.

Figure 1:
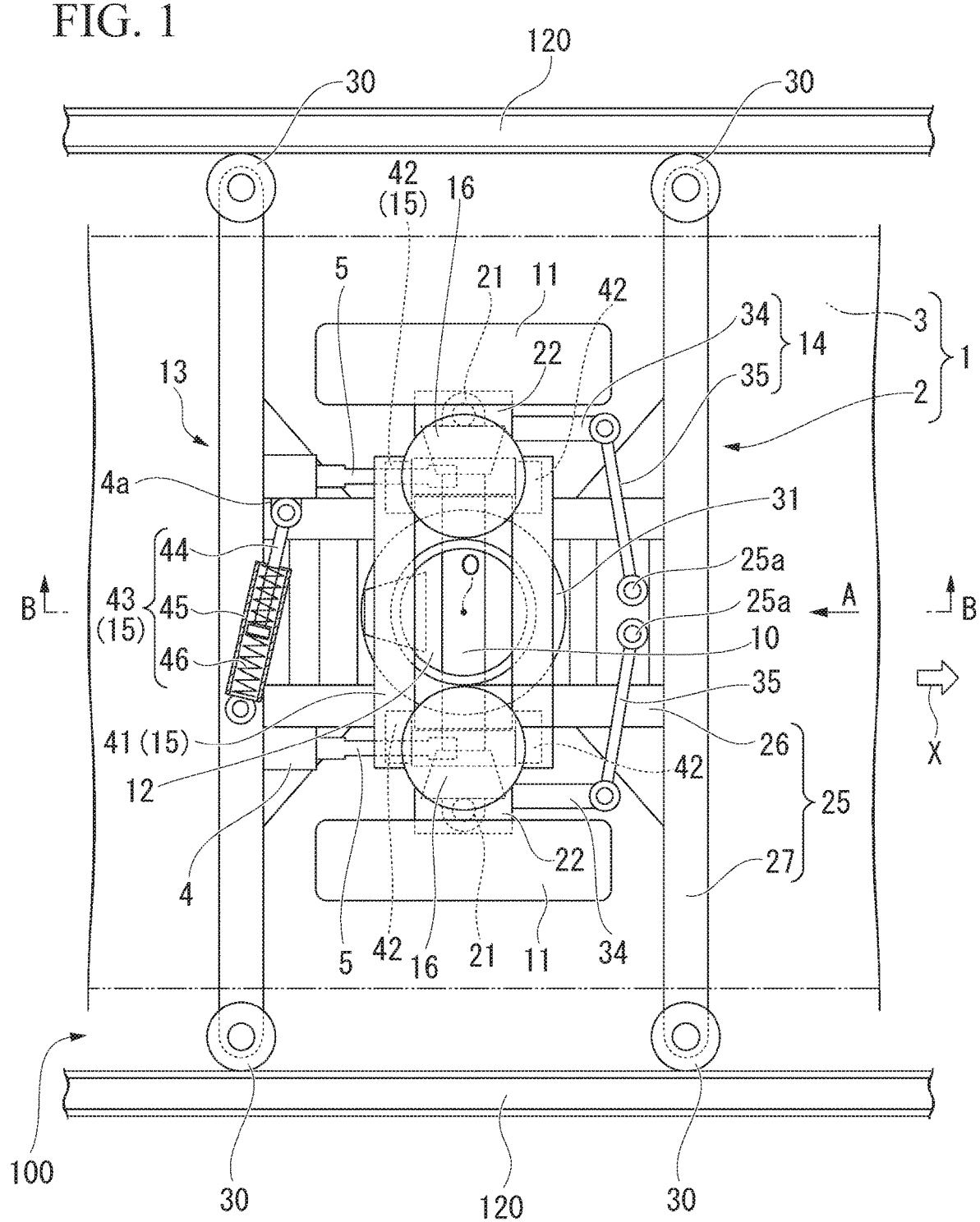
FIG. 1 a plan view of a bogie of a guideway vehicle according to a first embodiment of the present invention.
Figure 2:
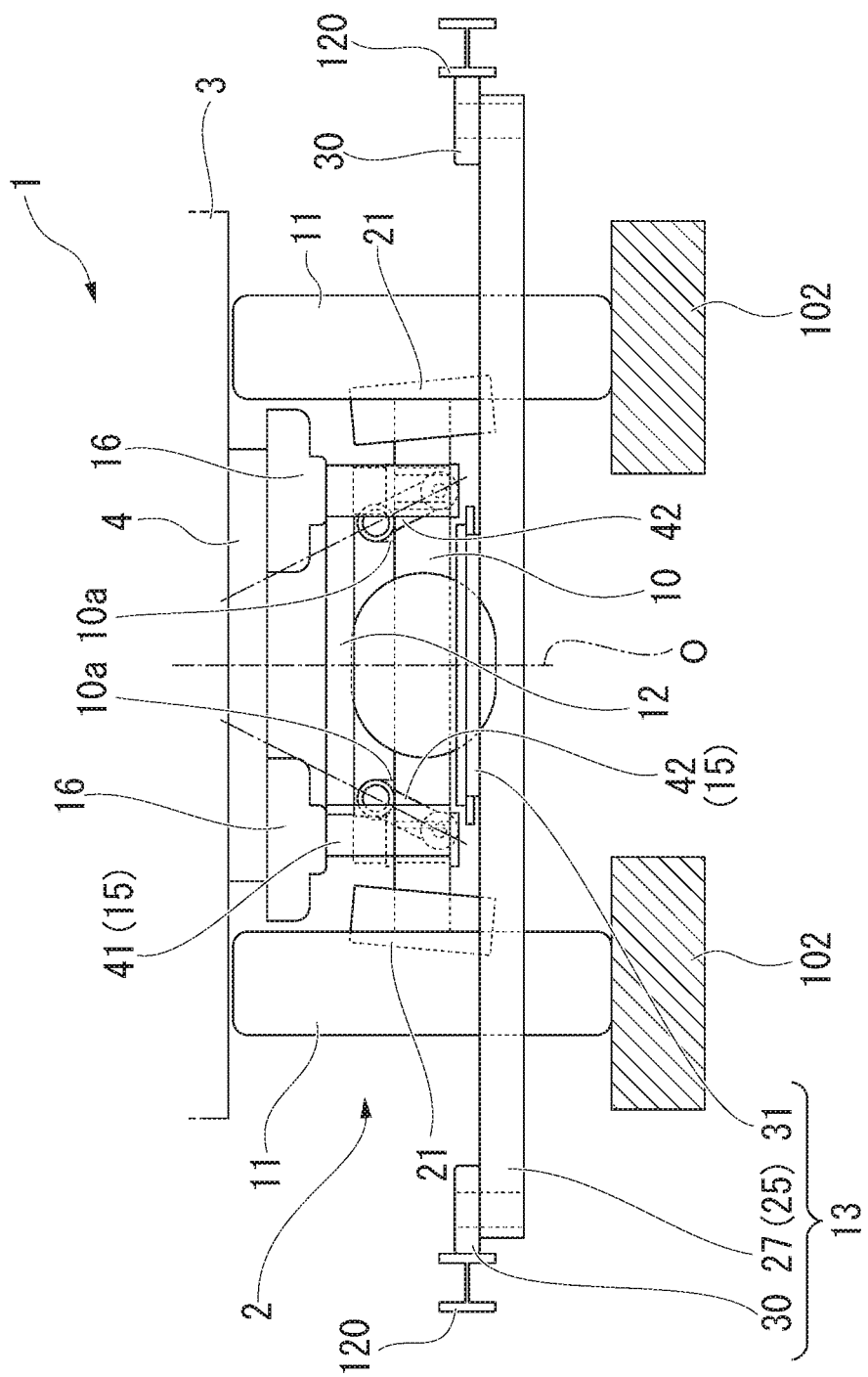
FIG. 2 is a view showing the bogie of the guideway vehicle according to the first embodiment of the present invention when viewed from a front side in a running direction and is a view seen from A of FIG. 1.
Figure 3:
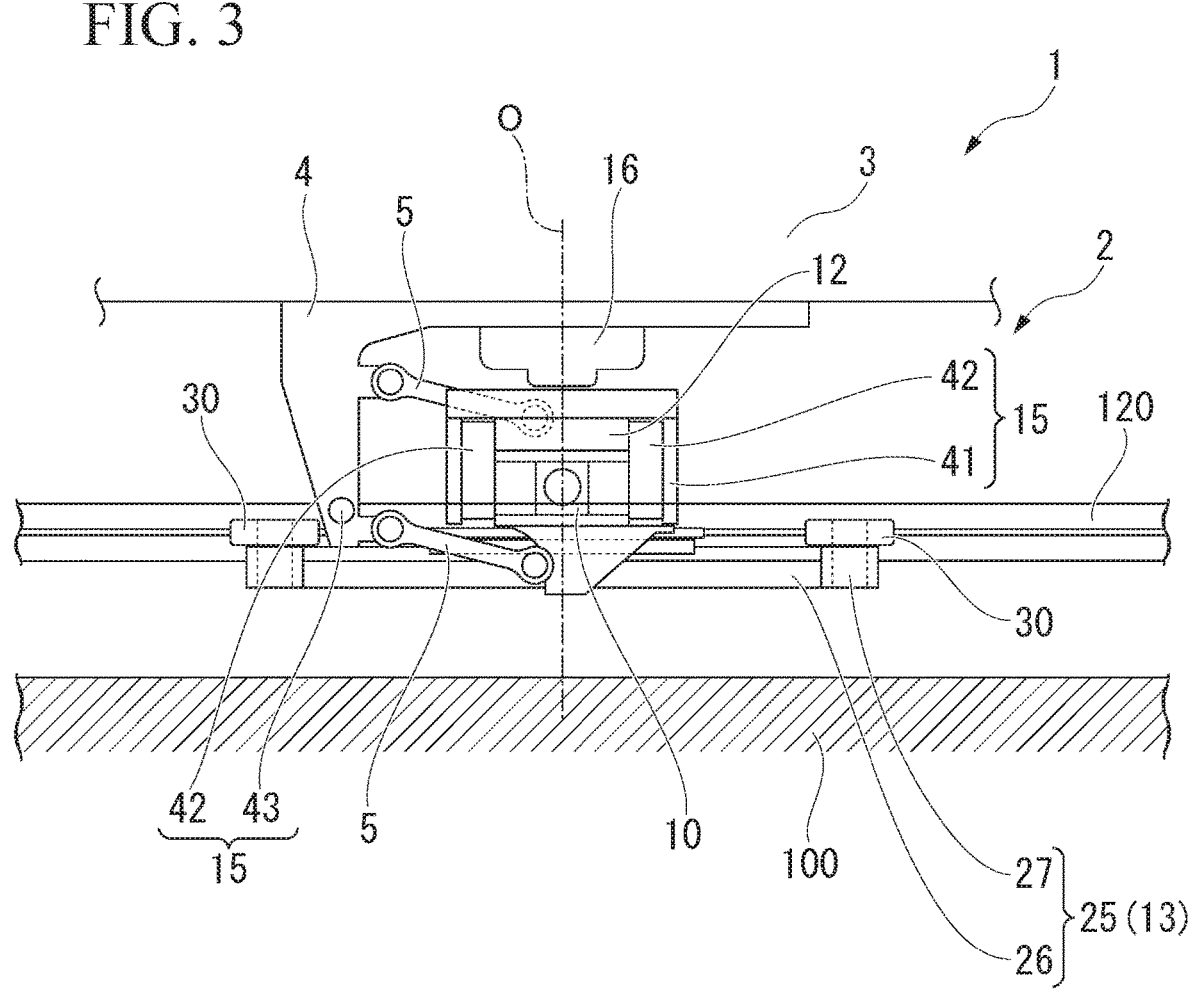
FIG. 3 is a view showing the bogie of the guideway vehicle according to the first embodiment of the present invention when viewed from a width direction and is a cross-sectional view B-B of FIG. 1.

As shown in FIGS. 1 to 3, the guideway vehicle 1 according to the embodiment is a vehicle of a new transportation system that runs on a guideway 100 while being guided by a guide rail 120 provided on the guideway 100.

In the embodiment, the guideway vehicle 1 is of a new transportation system of a side guide rail type (side guide type) in which the guide rails 120 extending in the extension direction of the guideway 100 are provided on both sides at the outside of the guideway 100 in the width direction.

Further, the guideway vehicle 1 includes a bogie 2 which runs on a road surface 102 of the guideway 100 and a body 3 which is supported by the bogie 2.

Here, the guideway vehicle 1 runs in a direction indicated by an arrow X of FIG. 1 (the right side of the paper of FIG. 1). Hereinafter, the front and rear sides when viewed in the running direction of the guideway vehicle 1 are referred to as the front and rear sides and the left and right sides when viewed from the front side in the running direction are referred to as the left and right sides in the width direction of the bogie (hereinafter, simply referred to as the width direction).

In the embodiment, two bogies 2 are installed on a lower portion of the body 3 so as to be located at the front and rear sides in the running direction for each vehicle.

Each of the bogies 2 includes an axle 10 which is provided below the body 3, running wheels 11 which are attached to the axle 10, a chassis 12 which supports the axle 10, a guide device 13 which is provided in the chassis 12, a steering device 14 which is able to steer running wheels 11 by the guide device 13, and a tilting device 15 which is connected to the guide device 13 and tilts the body 3 in the width direction.

Further, the bogie 2 includes two bolster springs 16 (for example, air springs) which are provided between the bogie and the body 3 so as to be away from each other in the width direction for each bogie.

The axle 10 includes a pair of kingpins 21 which is provided on both left and right sides in the width direction at the end portion in the width direction and an attachment shaft 22 which is provided in the kingpin 21.

The running wheel 11 is a rubber tire which is attached to the axle 10 through the attachment shaft 22 and is rotatable around the kingpin 21 together with the attachment shaft 22.

The chassis 12 supports the axle 10 so as to be rotatable of them and is attached to a suspension frame 4 fixed to an underframe of the body 3 and extending downward through a traction rod 5.

The guide device 13 includes a guide frame 25 which has guide wheels 30 formed at both left and right ends in the width direction and a turning bearing 31 which attaches the guide frame 25 to the chassis 12 so as to be able to turn around a turning axis O along the vertical direction.

The guide frame 25 mainly includes a vertical beam 26 and a horizontal beam 27. Two horizontal beams 27 are provided so as to sandwich the running wheel 11 from the front and rear sides. Then, one guide wheel 30 is provided at each of both left and right ends of each horizontal beam 27 in the width direction. These guide wheels 30 are rotatable around the axis extending in the vertical direction and contact the guide rails 120 in accordance with the running of the guideway vehicle 1 so as to roll on the side surfaces of the guide rails 120.

Figure 4:
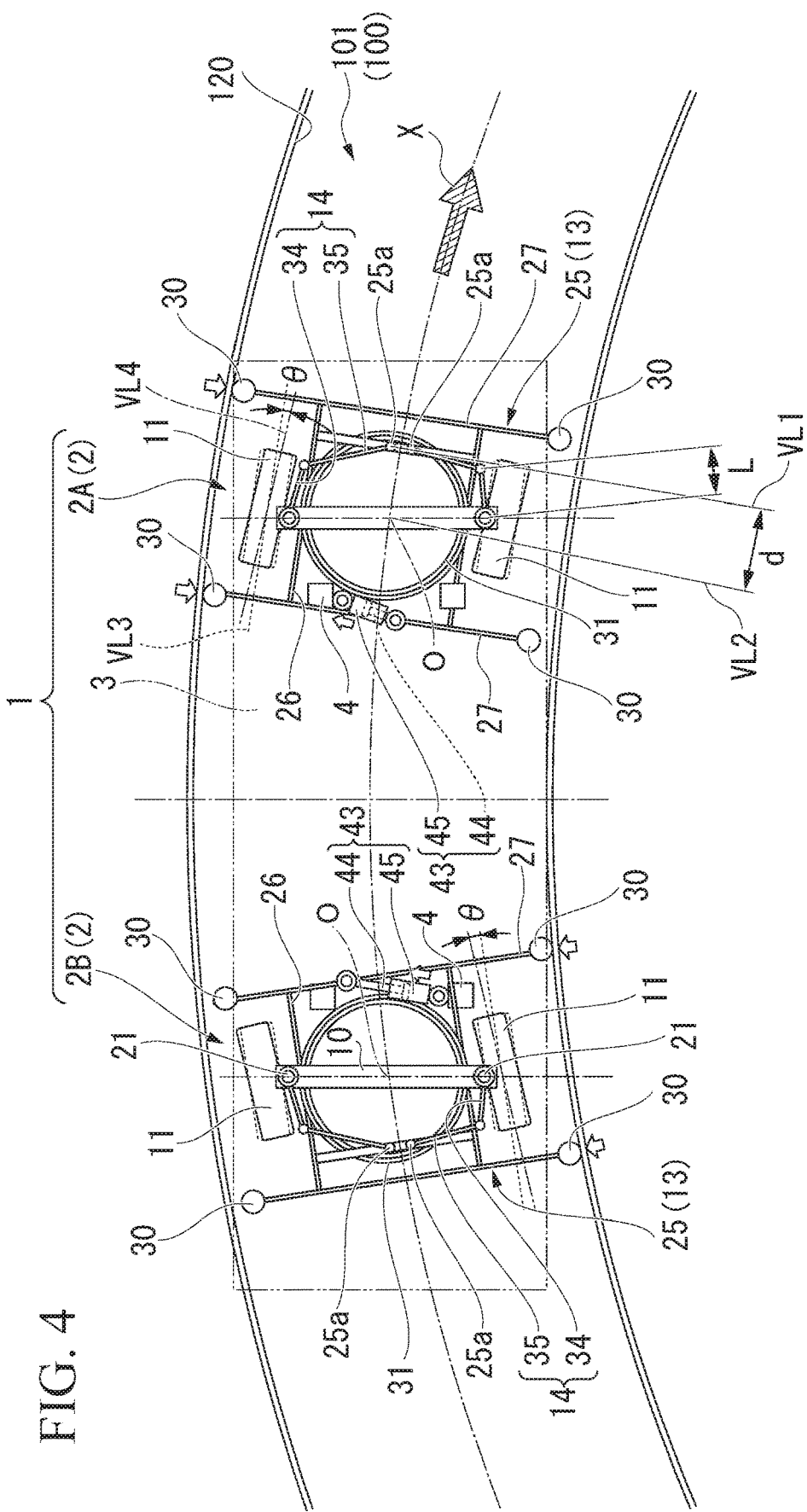
FIG. 4 is a plan view schematically showing a state in which the guideway vehicle according to the first embodiment of the present invention passes through a curved section.

As shown in FIG. 4, when the guideway vehicle 1 runs on a curved section 101 of the guideway 100, the guide frame 25 turns around the turning axis O along the curved section 101. That is, in a front bogie 2A of the guideway vehicle 1, the guide wheel 30 receives a reaction force from the guide rail 120 located at the outside of the curved section 101 and the guide frame 25 turns so that the outer guide wheel 30 is pushed forward in relation to the inner guide wheel 30. On the other hand, in a rear bogie 2B of the guideway vehicle 1, the guide wheel 30 receives a reaction force from the guide rail 120 located at the inside of the curved section 101 and the guide frame 25 turns so that the inner guide wheel 30 is pushed forward in relation to the outer guide wheel 30.

Hereinafter, since the front bogie 2A and the rear bogie 2B are provided so as to be inverted with reference to the center position of the body 3 in the running direction, the front bogie 2A will be representatively described.

The steering device 14 of the bogie 2A is provided on the front side of the axle 10 in the running direction of the guideway vehicle 1. The steering device 14 includes a pair of steering arms 34 which extends from each of the attachment shafts 22 in the running direction and a pair of steering rods 35 which connects each of the steering arms 34 to the guide frame 25 by a connection portion 25a located at the substantially center position of the guide frame 25 in the width direction.

Each steering arm 34 of the steering device 14 of the bogie 2A swings and rotates together with the running wheel 11 around the center axis (the steering axis) of the kingpin 21 along the vertical direction as the rotation center. The steering arm 34 is pin-joined to the attachment shaft 22 so as to be rotatable with respect to the attachment shaft 22 and is provided so as to extend from the attachment shaft 22 forward in the running direction while the guideway vehicle 1 runs on a straight portion of the guideway 100.

One end portion of the steering rod 35 is pin-joined to the front end portion of the steering arm 34. Further, the steering rod 35 extends from the steering arm 34 in the width direction while the guideway vehicle 1 runs on the straight portion of the guideway 100. Then, the other end portion of the steering rod 35 is pin-joined to the connection portion 25a of the guide frame 25 so as to be rotatable around the center axis along the vertical direction. In the embodiment, a distance d between the turning axis O and the connection portion 25a in the running direction is longer than a length L of the steering arm 34. Here, the distance d between the turning axis O and the connection portion 25a in the running direction means a distance between a virtual line VL1 along the extension direction of the horizontal beam 27 and a virtual line VL2 passing through the turning axis O and parallel to the virtual line VL.

Then, when the guide frame 25 turns around the turning axis O, the position of the steering rod 35 is displaced with the turning movement and the attachment shaft 22 is rotated around the kingpin 21 through the steering arm 34 so that the running wheels 11 are steered.

The tilting device 15 includes bolster spring receivers 41 which support the bolster springs 16 from below, hanging link members 42 that connect the bolster spring receivers 41 to the axle 10, and a tilt guide member 43 which connects the suspension frame 4 to the guide frame 25.

The bolster spring receiver 41 is provided so as to cover the axle 10 from above. The bolster spring receiver 41 is operated in accordance with the operation of the body 3.

The upper portion of the hanging link member 42 is connected to the axle 10 so as to be rotatable around the rotation axis along the running direction and the lower portion thereof is connected to the bolster spring receiver 41 so as to be rotatable around the rotation axis along the running direction. The pair of hanging link members 42 are provided so as to be away from each other in the width direction and obliquely extend so as to be away from each other in the width direction from top to bottom. Although not described in detail, the upper portion of the hanging link member 42 is connected to a receiving portion 10a which protrudes upward from the axle 10. In the embodiment, two pairs of hanging link members 42 are provided with the axle 10 interposed therebetween in the running direction.

The tilt guide member 43 includes a rod portion 44 which connect the suspension frame 4 to the guide frame 25, a rod portion 45 and an elastic member 46 that is provided in the rod portion 44.

In the front bogie 2A, the rod portion 44 extends in the width direction and one end of the rod portion 44 is connected to a receiving portion 4a provided in the suspension frame 4. The rod portion 44 is provided in the suspension frame 4 so as to be rotatable around the axis along the vertical direction.

The rod support portion 45 is provided so as to be movable relative to the rod portion 44 in the extension direction of the rod portion 44. For example, the rod support portion 45 has a cylindrical shape and accommodates the other end of the rod portion 44. One end of the rod support portion 45 is connected to the horizontal beam 27 on the rear side of the axle 10 in the running direction. The rod support portion 45 is provided in the horizontal beam 27 so as to be rotatable around the axis along the vertical direction.

In the front bogie 2A, the rod support portion 45 pushes the suspension frame 4 toward the outside of the curved section 101 along with the rod portion 44 in accordance with the turning movement of the guide frame 25. In the rear bogie 2B, the rod support portion 45 pulls the suspension frame 4 toward the outside of the curved section 101 along with the rod portion 44 in accordance with the turning movement of the guide frame 25.

The elastic member 46 is a coil spring or the like and is provided inside the rod support portion 45. The elastic member 46 applies a reaction force to the rod portion 44 so that a relative position between one end of the rod support portion 45 connected to the suspension frame 4 and one end of the rod portion 44 connected to the horizontal beam 27 returns to a position before turning when the guide frame 25 turns. That is, a reaction force of pushing the horizontal beam 27 toward the inside of the curved section 101 acts on the front bogie 2A and a reaction force of pulling the horizontal beam 27 toward the inside of the curved section 101 acts on the rear bogie 2B. Accordingly, the tilt guide member 43 functions as a reaction spring.

The upper portion of the bolster spring 16 is attached to the underframe of the body 3 and the lower portion thereof is attached to the bolster spring receiver 41. The bolster spring 16 relaxes the relative vertical movement of the running wheels 11 with respect to the body 3.

Figure 5:
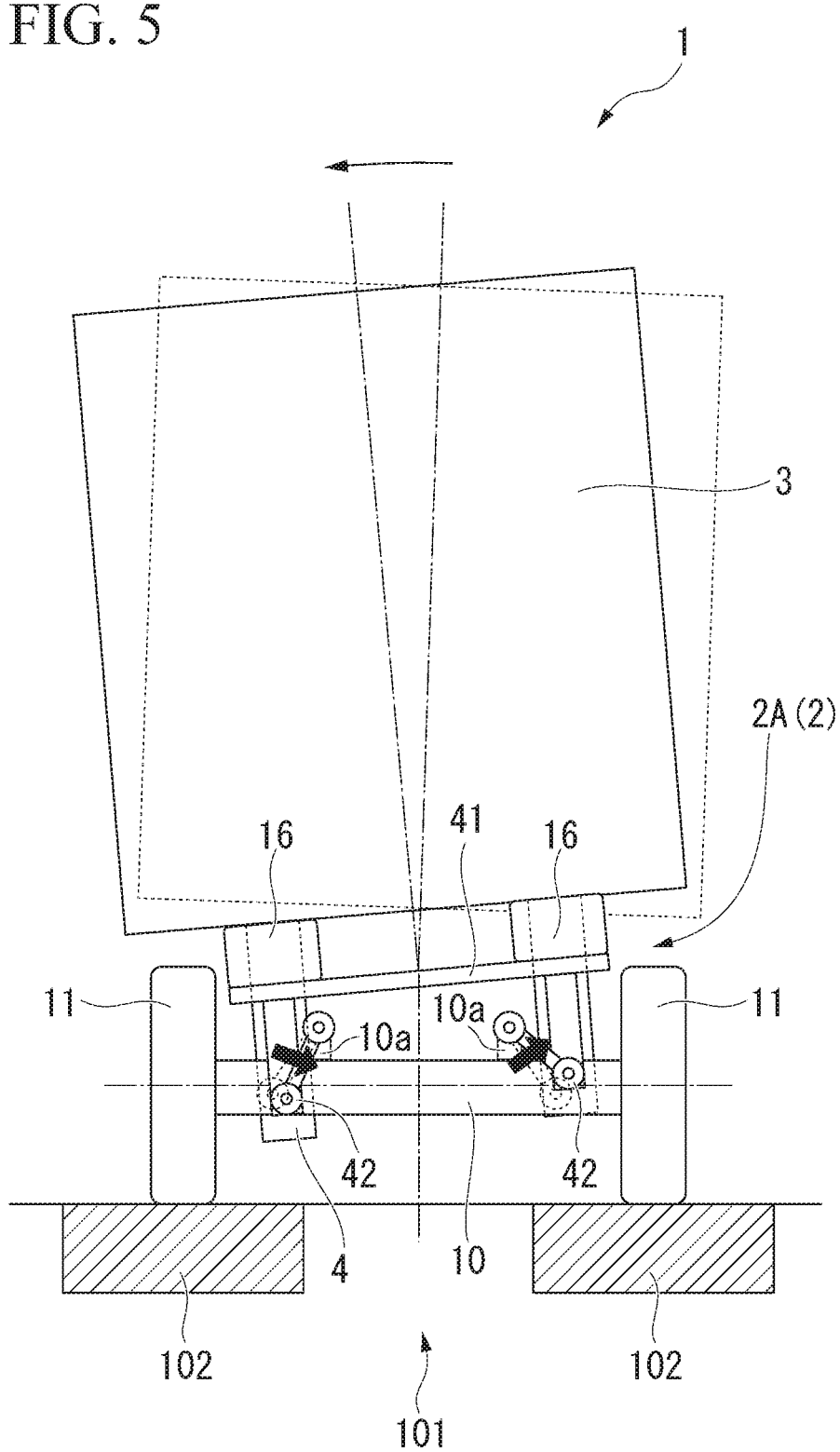
FIG. 5 is a view showing the guideway vehicle according to the first embodiment of the present invention when viewed from the front side in the running direction and is a view showing a state in which a body of the guideway vehicle is tilted at the curved section.

Next, a case in which the body 3 is tilted by the tilting device 15 will be described with reference to FIGS. 4 and 5. FIG. 5 is a view in which the front bogie 2A is viewed from the front side in the running direction and a part of components is omitted for description.

As shown in FIG. 4, when the guide frame 25 turns at the curved section 101, the tilt guide member 43 pushes the suspension frame 4 toward the outside of the curved section 101. That is, when the guideway vehicle 1 runs on the curved section 101, a part of the turning force of the guide frame 25 is transmitted to the body 3 through the suspension frame 4 by the tilt guide member 43. As a result, the body 3 is pushed by the tilt guide member 43 toward the outside of the curved section 101 through the suspension frame 4.

At this time, the bolster spring receiver 41 also tries to move toward the outside of the curved section 101 in the width direction as in the body 3 through the bolster spring 16. Then, as shown in FIG. 5, the lower portion of the hanging link member 42 connected to the bolster spring receiver 41 also tries to move toward the outside of the curved section 101 in the width direction in accordance with the movement of the bolster spring receiver 41.

Since the pair of hanging link members 42 are inclined downward so as to be away from each other in the width direction, when the lower portion of one of the hanging link members 42, which is located at the inside of the curved section 101 (the left side of the paper of FIG. 5), moves toward the outside of the curved section 101 (the right side of the paper of FIG. 5), this lower portion of the hanging link member 42 moves downward. On the other hand, when the lower portion of the other of the hanging link members 42, which is located at the outside of the curved section 101 (the right side of the paper of FIG. 5), moves toward the outside of the curved section 101 (the right side of the paper of FIG. 5), this lower portion of the hanging link member 42 moves upward.

As a result, one portion of the bolster spring receiver 41 at the outside of the curved section 101 is raised to be higher than the other portion of the bolster spring receiver 41 at the inside of the curved section 101, thereby the body 3 can be also tilted so that one side of the body 3 located at the outside of the curved section 101 is raised with respect to the other side of the body 3 located at the inside of the curved section. 101. Accordingly, when the vehicle runs on the curved section 101, the body 3 is tilted in the width direction so as to fall to the inside of the curved section 101.

Further, in the bogie 2B on the rear side in the running direction, when the guide frame 25 turns at the curved section 101, the tilt guide member 43 pulls the suspension frame 4 toward the outside in the width direction. As a result, one portion of the bolster spring receiver 41 at the outside of the curved section 101 is raised to be higher than the other portion of the bolster spring receiver 41 at the inside of the curved section 101, thereby the body 3 can be also tilted so that one side of the body 3 located at the outside of the curved section 101 is raised with respect to the other side of the body 3 located at the inside of the curved section. 101. Accordingly, the body 3 is tilted in the width direction so as to fall to the inside of the curved section 101.

In the guideway vehicle 1 of the above-described embodiment, when the vehicle runs on the curved section 101, the guide frame 25 turns along the curved section 101 of the guideway 100 so that the running wheels 11 are steered. At this time, the body 3 can be tilted toward the inside of the curved section 101 in the width direction using a mechanical configuration which is the tilting device 15 in accordance with the turning movement of the guide device 13. Thus, a centrifugal force generated when running on the curved section 101 can be cancelled out by the tilting of the body 3. As a result, the guideway vehicle 1 can run on the curved section 101 at a high speed while preventing lateral acceleration received by the passenger in the vehicle (while preventing deterioration of the ride comfort).

Particularly, in the embodiment, since an operation in which the tilt guide member 43 pushes (or pulls) the body 3 can be started by the tilting operation of the vehicle body, it is possible to tilt the body 3 with a simple structure in response to the turning movement of the guide frame 25.

Furthermore, when the guideway vehicle 1 running on the curved section 101 of the guideway 100 starts to run on the straight portion of the guideway 100, the guide frame 25 turns along the straight portion so as to return to an original state. At this time, since the tilt guide member 43 connects the suspension frame 4 and the guide frame 25 to each other, a reaction force of the elastic member 46 acts on the body 3 so that a force of returning the tilted body 3 so as not to be tilted can be given to the body 3.

Thus, since the tilting of the body 3 can be promptly ended after the guideway vehicle 1 passes through the curved section 101, it is possible to prevent the body 3 from being tilted also in the straight portion and thus to improve the ride comfort.

Further, even when the turning force of the guide frame 25 is large, it is possible to absorb the turning force by the deformation of the elastic member 46 and to prevent the body 3 from being tilted more than necessary.

Further, it is possible to prevent the turning movement of the guide device 13 due to the reaction force (the elastic force) of the elastic member 46 when the guide frame 25 turns in small steps due to the vibration generated when running on the straight portion. Thus, it is possible to prevent the body 3 from being suddenly tilted at a position other than the curved section 101 by appropriately setting the magnitude of the elastic force of the elastic member 46.

Further, the rod support portion 45 of the tilt guide member 43 is connected to the suspension frame 4 originally provided in the body 3. Thus, since the body 3 can be tilted by transmitting the turning force of the guide frame 25 to the body 3 using the originally provided suspension frame 4 in this way, it is possible to minimize the addition of components accompanying the addition of the vehicle body tilting function and to tilt the body 3 with a simpler structure.

Further, in the embodiment, the lower portion of the hanging link member 42 is connected to the bolster spring receiver 41. Thus, after the running of the curved section 101 ends, the bolster spring receiver 41 which is raised to one side in the width direction tries to return to an original state, that is, a state in which both sides of the bolster spring receiver 41 are disposed at the same height position in the width direction due to gravity. Thus, since it is possible to prevent the body 3 from being suddenly tilted when running on the straight portion, it is possible to improve the stability at the time of running.

Furthermore, in the embodiment, the distance d between the turning axis O and the connection portion 25a in the running direction is longer than the length L of the steering arm 34. Thus, the running wheels 11 can be steered by a greater amount compared to a case in which the distance d between the turning axis O and the connection portion 25a is about the same as the length L of the steering arm 34. Thus, in the front bogie 2A, the steering rod 35 can be moved by a greater amount toward the inside of the curved section 101 in response to the turning movement of the guide frame 25, so that the running wheels 11 can be steered by a greater amount to the inside of the curved section 101. Further, in the rear bogie 2B, the steering rod 35 can be moved by a greater amount toward the inside of the curved section 101, so that the running wheels 11 can be steered by a greater amount toward the outside of the curved section 101.

That is, as shown in FIG. 4, the steering angle of the running wheel 11 (the running wheel indicated by a solid line) of the embodiment can be set to be larger than the steering angle of the running wheel (the running wheel indicated by a dashed line) in a case in which the distance d between the turning axis O and the connection portion 25a in the running direction is longer than the length L of the steering arm 34.

As a result, in the front bogie 2A, the running wheels 11 are steered toward the inside of the curved section 101 in relation to the tangential direction of the curved section 101 so that the running wheels 11 have a slip angle θ. Then, in the rear bogie 2B, the running wheels 11 are steered toward the outside of the curved section 101 in relation to the tangential direction of the curved section 101 so that the running wheels 11 have a slip angle θ. As a result, a cornering force can be generated between the road surface 102 and the running wheel 11. Here, the slip angle θ indicates an angle formed between a virtual line VL3 extending in the tangential direction of the curved section 101 at a position where the center axis of the kingpin 21 exists and a center line VL4 of the running wheel 11 in the tire width direction.

Here, the guide wheel 30 on the outside of the curved section 101 contacts the guide rail 120 in the front bogie 2A and the guide wheel 30 on the inside of the curved section 101 contacts the guide rail 120 in the rear bogie 2B. At this time, a reaction force is applied from the guide rail 120 to each guide wheel 30. Particularly, this reaction force increases at the time of running at a high speed while the body of the guideway vehicle is tilted, but the reaction force received by the guide wheel 30 can be reduced by the cornering force. Thus, since there is no need to increase the durability of the guide wheel 30 or the guide frame 25, for example, an increase in the size or the like of the guide device 13 can be prevented.

Here, in the embodiment, the rod support portion 45 of the tilt guide member 43 is connected to the suspension frame 4. However, a receiving portion may be provided in a separate body 3 and the rod support portion 45 may be connected to the receiving portion.

Furthermore, the tilt guide member 43 may be provided with a booster mechanism using a hydraulic pressure or the like.

Second Embodiment

Figure 6:
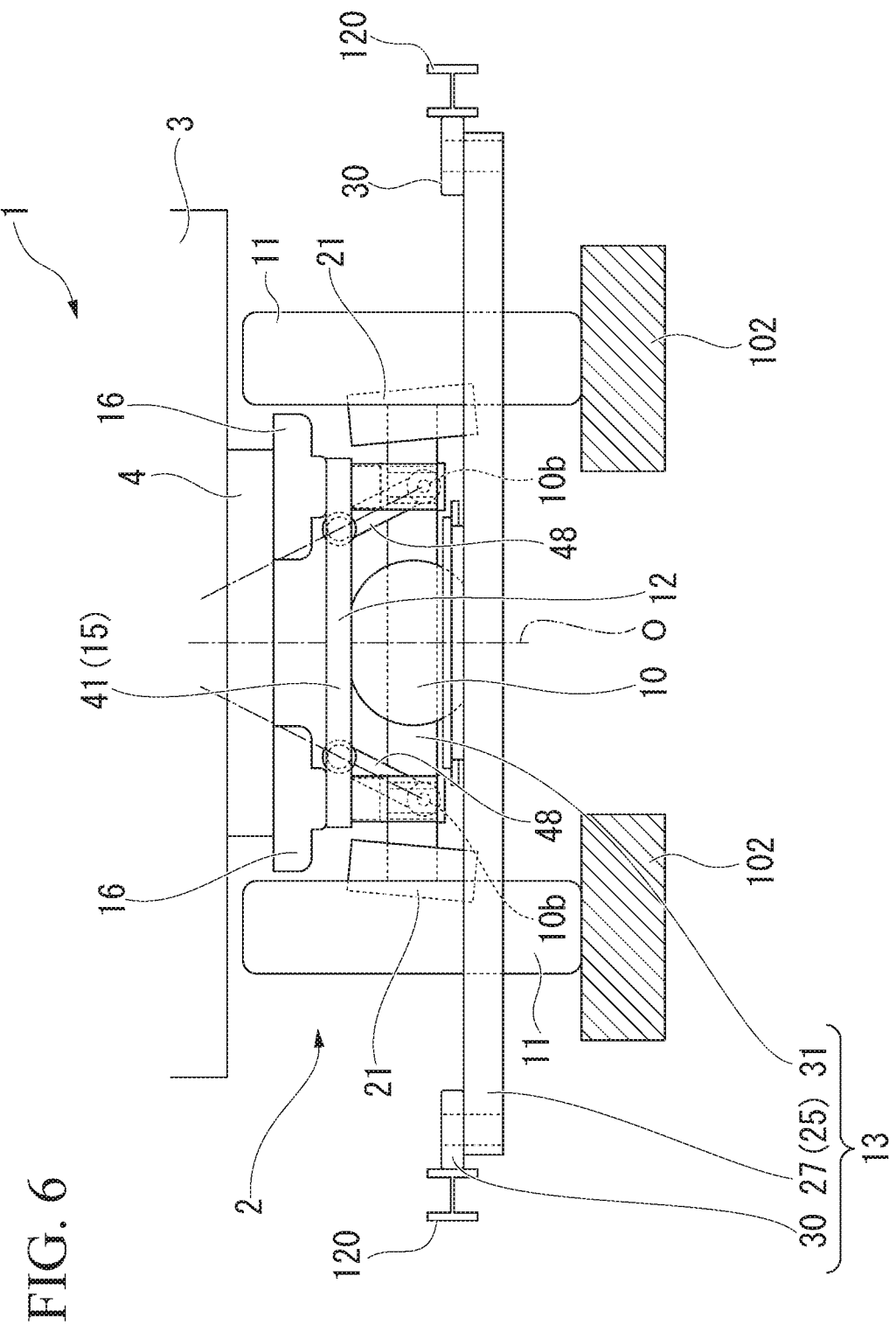
FIG. 6 is a view showing a bogie of a guideway vehicle according to a second embodiment of the present invention when viewed from a front side in a running direction.

Next, a second embodiment of the present invention will be described with reference to FIG. 6. Additionally, the same components as those of the first embodiment will be denoted by the same reference numerals and detailed description will be omitted.

In the embodiment, the connection position of the hanging link member 48 is different from that of the first embodiment.

That is, the upper portion of each hanging link member 48 is connected to the bolster spring receiver 41 so as to be rotatable around the rotation axis along the running direction and the lower portion of the hanging link member 48 is connected to the axle 10 so as to be rotatable around the rotation axis along the running direction. Similarly to the first embodiment, the pair of hanging link members 48 are provided so as to be away from each other in the width direction and obliquely extend so as to be away from each other in the width direction from top to bottom. Although not described in detail, the lower portion of the hanging link member 48 is connected to, for example, a receiving portion 10b protruding from the axle 10 in the running direction.

According to the guideway vehicle 1 of the above-described embodiment, similarly to the first embodiment, when the vehicle runs on the curved section 101, the guide frame 25 turns along the curved section 101 of the guideway 100 so that the running wheels 11 are steered. At this time, the body 3 can be tilted toward the inside of the curved section 101 in the width direction using the mechanical configuration which is the tilting device 15 in accordance with the turning movement of the guide frame 25. Thus, a centrifugal force generated when running on the curved section 101 can be cancelled out by the tilting of the body 3.

Further, since the upper portion of the hanging link member 48 is fixed to the bolster spring receiver 41, the bolster spring receiver 41 can be operated by a smaller force compared to the case of the first embodiment. On the other hand, since there is a possibility that the bolster spring receiver 41 may swing due to small vibrations while running on the straight portion, it is desirable to prevent such a swing of the bolster spring receiver 41 by appropriately setting the elastic force of the elastic member 46 of the tilt guide member 43.

Third Embodiment

Figure 7:
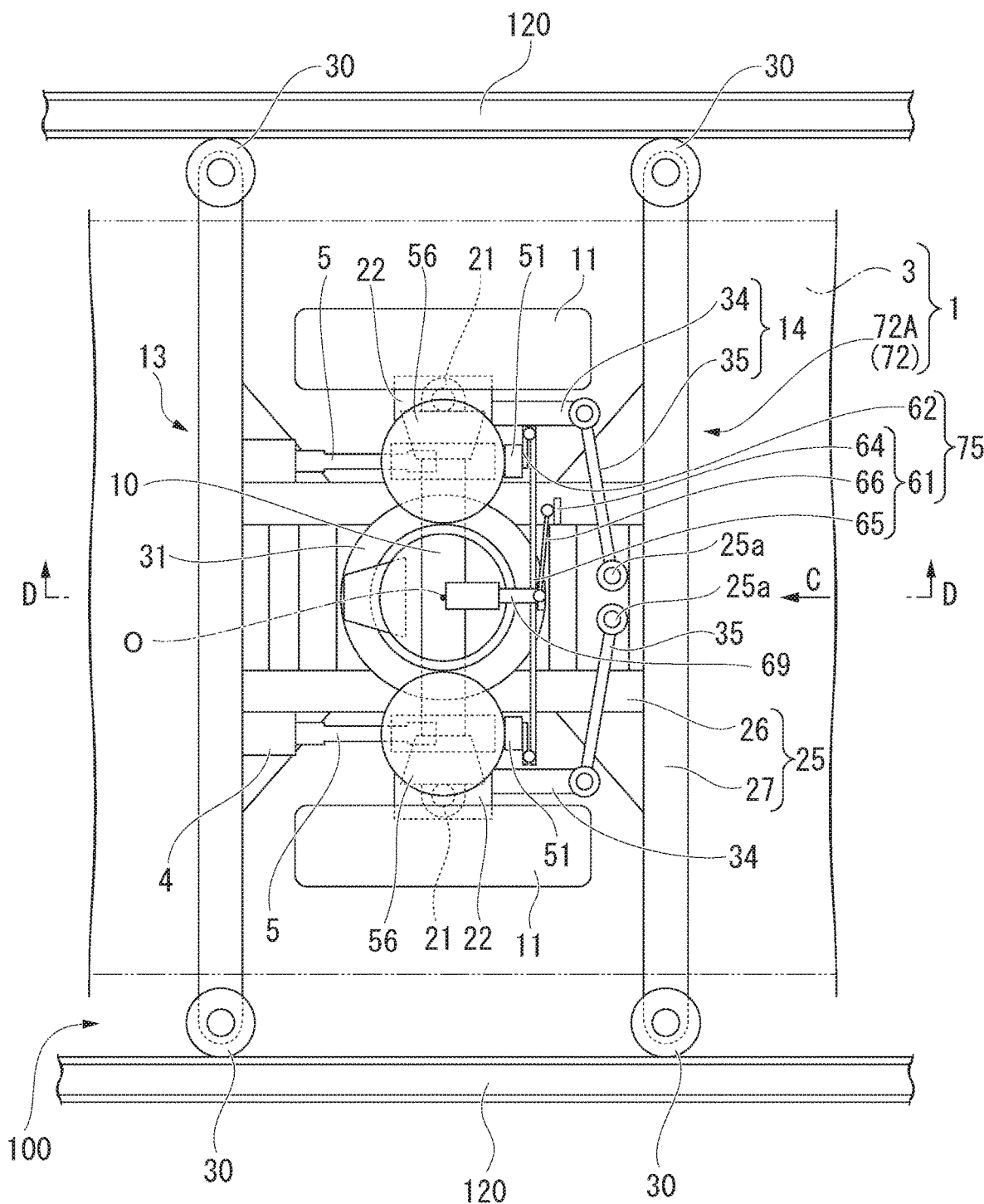
FIG. 7 is a plan view of a bogie of a guideway vehicle according to a third embodiment of the present invention.
Figure 8:
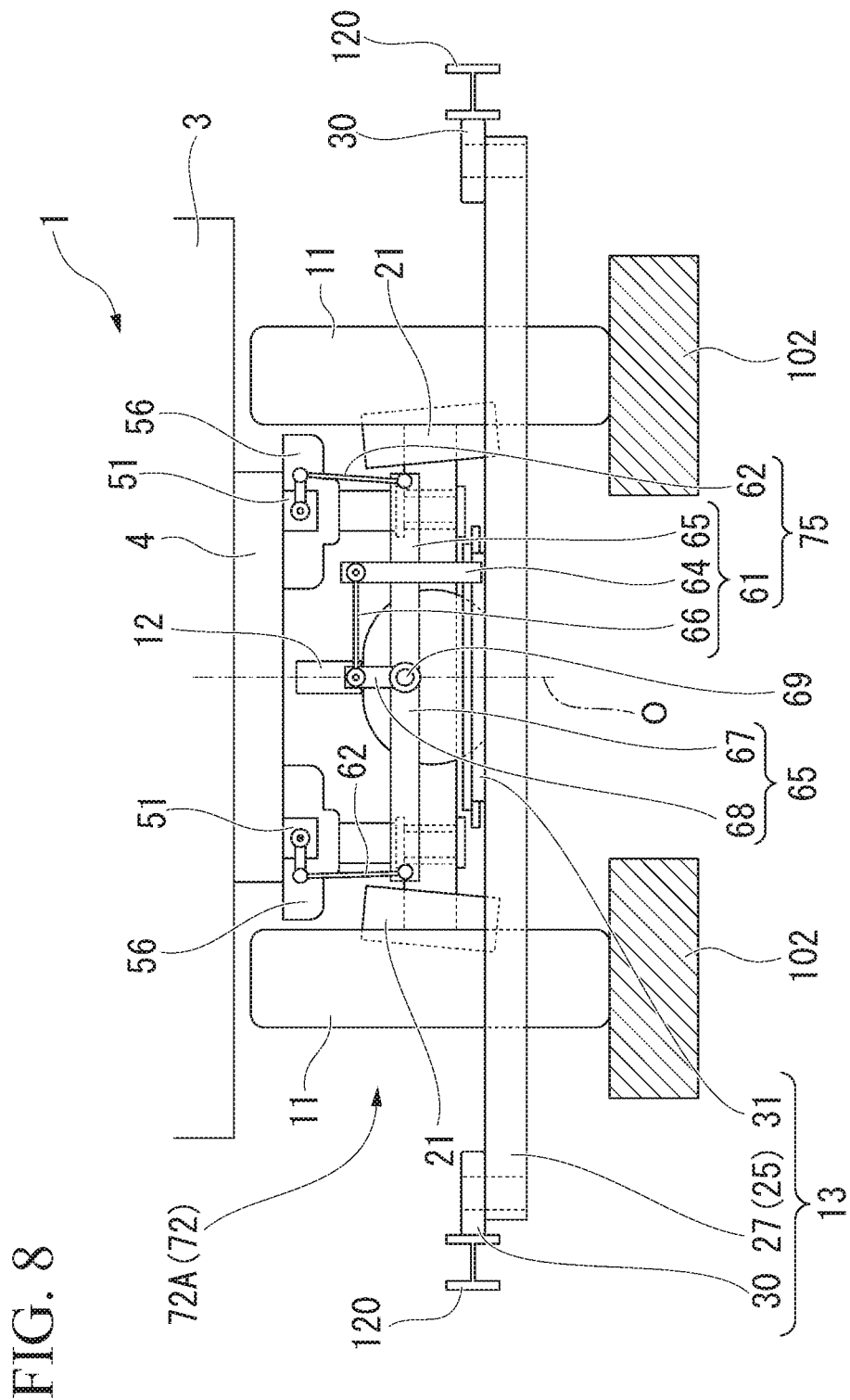
FIG. 8 is a view showing the bogie of the guideway vehicle according to the third embodiment of the present invention when viewed from a front side in a running direction and is a view seen from C of FIG. 7.
Figure 9:
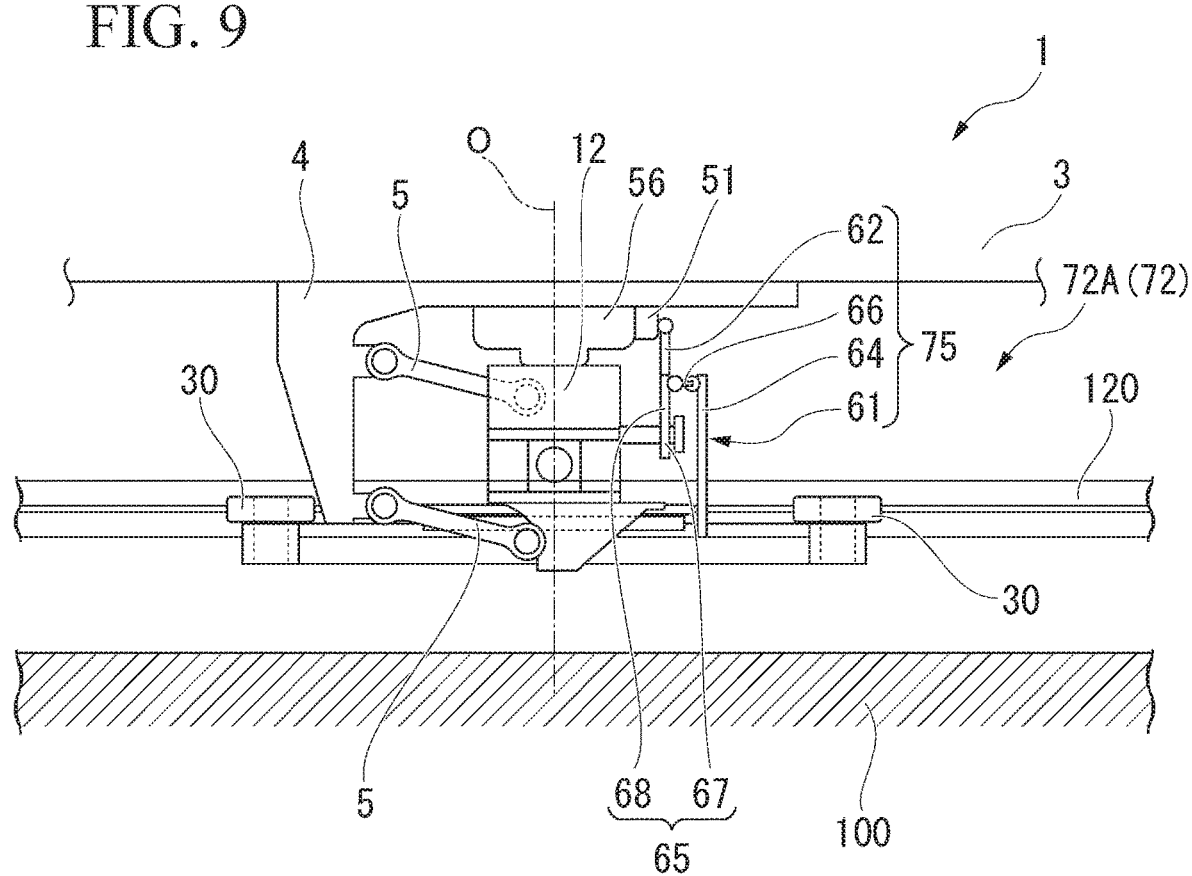
FIG. 9 is a view showing the bogie of the guideway vehicle according to the third embodiment of the present invention when viewed from a width direction and is a cross-sectional view D-D of FIG. 7.

Next, a third embodiment of the present invention will be described with reference to FIGS. 7 to 9. Additionally, the same components as those of the above-described embodiments will be denoted by the same reference numerals and detailed description will be omitted. The embodiment is greatly different from the first embodiment and the second embodiment in that the bolster spring receiver 41 is not provided.

In the embodiment, a bogie 72 includes an air spring 56 which is a bolster spring and a height adjustment valve 51 which supplies and discharges air inside the air spring 56.

Each height adjustment valve 51 is provided in each air spring 56. The height adjustment valve 51 supplies air to the air spring 56 or discharges air from the air spring 56 in response to a variation in the weight of the body 3 according to a variation in transportation amount so that the height of the body 3 is kept constant.

Further, in the embodiment, the tilting device 75 is provided on the vehicle end side in the running direction in relation to the axle 10, that is, the same side as the steering device 14. The tilting device 75 includes a hanging link member 61 that is connected to the guide frame 25 and a pair of adjusting rods 62 which connects each of both left and right end portions of the hanging link member 61 in the width direction to the height adjustment valve 51 corresponding to each of both end portions.

The hanging link member 61 includes a support portion 64 which is fixed to the horizontal beam 27 of the guide frame 25, a link main body 65 which is disposed so as to intersect the support portion 64 and extends in the width direction, and a connecting rod 66 which connects the link main body 65 to the support portion 64.

The link main body 65 includes a main body 67 which extends in the width direction and a protrusion portion 68 which extends upward at the center position of the main body 67 in the width direction and forms an inverse T-shape when viewed from the running direction. The main body 67 is provided in the chassis 12 or the axle 10 so as to be rotatable around the center axis extending in the running direction by a pin 69.

The support portion 64 extends upward in the vertical direction from the horizontal beam 27 together with the horizontal beam 27 of the guide frame 25. The support portion 64 is disposed at a position displaced in the width direction from the center position in the width direction of the main body 67 of the link main body 65.

The connecting rod 66 extends in the width direction and connects the upper end of the support portion 64 to the upper end of the protrusion portion 68 of the link main body 65. The connecting rod 66 is provided in the support portion 64 and the protrusion portion 68 so as to be rotatable around the center axis extending in the running direction.

Each adjusting rod 62 extends in the vertical direction. The height adjustment valve 51 supplies air to the air spring 56 by raising the adjusting rod 62 and the height adjustment valve 51 discharges air from the air spring 56 by lowering the adjusting rod 62.

Figure 10:
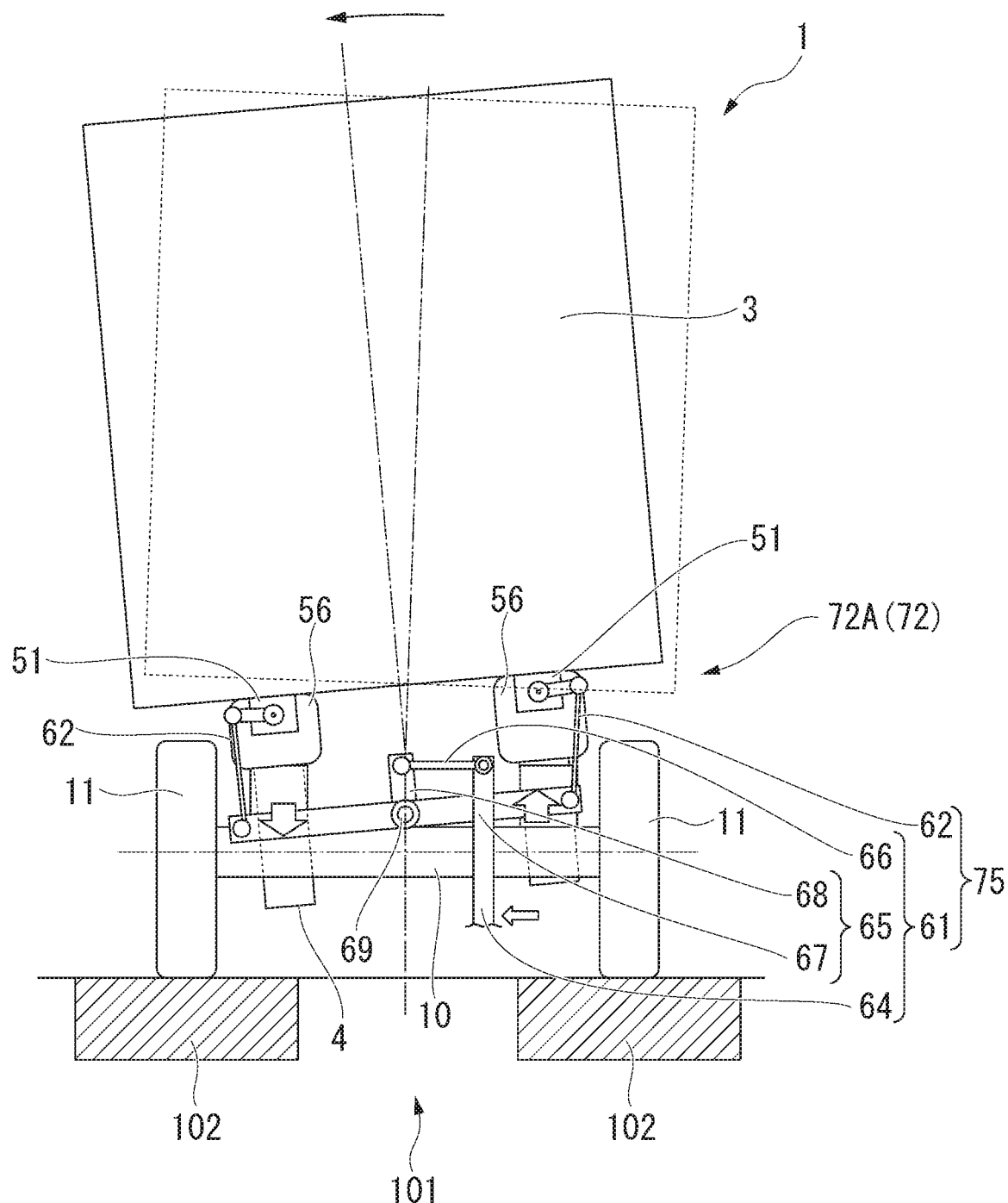
FIG. 10 is a view showing the guideway vehicle according to the third embodiment of the present invention when viewed from the front side in the running direction and is a view showing a state in which a body of the guideway vehicle is tilted at a curved section.

Next, a case in which the body 3 is tilted by the tilting device 75 will be described with reference to FIG. 10. FIG. 10 is a view in which a bogie 72A positioned at a font side is viewed from the front side in the running direction. Some components are omitted for description.

When the guide frame 25 turns at the curved section 101, the support portion 64 moves toward the inside of the curved section 101 (the lower side of the paper of FIG. 8) together with the horizontal beam 27. Then, the connecting rod 66 pushes the protrusion portion 68 of the link main body 65 toward the inside of the curved section 101. As a result, as shown in FIG. 10, the main body 67 of the link main body 65 rotates around the center axis so that one end portion (the outer end portion) of the main body 67 located at the outside of the curved section 101 is raised to be higher than the other end portion (the inner end portion) of the main body 67 located at the inside of the curved section 101.

Then, the adjusting rod 62 located at the outside of the curved section 101 is raised so that air is supplied to the air spring 56 located at the outside of the curved section 101 via the height adjustment valve 51. When the adjusting rod 62 is raised, it is considered that the body 3 is close to the bogie 72. Then, the height adjustment valve 51 supplies air to the air spring 56.

Further, the adjusting rod 62 located at the inside of the curved section 101 is lowered so that air is discharged from the air spring 56 located at the inside of the curved section 101 via the height adjustment valve 51. When the adjusting rod 62 is lowered, it is considered that the body 3 is away from the bogie 72 (that is, the weight of the body 3 decreases). Then, the height adjustment valve 51 discharges air from the air spring 56.

In this way, the body 3 is tilted in the width direction.

According to the guideway vehicle 1 of the above-described embodiment, since the hanging link member 61 is tilted in the width direction through the connecting rod 66 in response to the turning movement of the guide frame 25, the height of the air spring 56 can be adjusted by the height adjustment valve 51. That is, the air spring 56 located at the outside of the curved section 101 is expanded and the air spring 56 located at the inside of the curved section 101 is contracted, the body 3 can be tilted in the width direction so as to fall to the inside of the curved section 101 by the mechanical configuration of the hanging link member 61. Thus, since it is possible to cancel out a centrifugal force generated when running on the curved section 101 by tilting the body 3, the guideway vehicle 1 can run on the curved section 101 at a high speed.

Further, the bogie 72 of the embodiment does not include the bolster spring receiver 41 differently from the bogie 2 of the first embodiment and the second embodiment. Thus, since the number of components can be decreased, the entire bogie 72 can be made compact.

As described above, the embodiments of the present invention have been described with reference to the drawings, but the configurations and the combination thereof in the embodiments are examples. For example, additions, omissions, replacements, and other modifications of the configuration can be made without departing from the spirit of the present invention. Further, the present invention is not limited to the embodiments, but is limited only to the claims.

For example, in the above-described embodiment, the guide wheel 30 receives a reaction force from the guide rail 120 so that the guide frame 25 turns. However, for example, the tilting devices 15 and 75 may be provided in the bogie having an automatic steering mechanism in which the guide wheel 30 runs without contacting the guide rail 120 and the guide frame 25 automatically turns along the curved section 101 at the curved section 101.

Further, although the bogie 2 and 72 have been described as side guide type bogie, the tilting devices 15 and 75 may be provided in center guide type bogie. The tilting devices 15 and 75 may be operated not only in the width direction, but also in the vertical direction.

INDUSTRIAL APPLICABILITY

According to the bogie and the vehicle, it is possible to run on the curved section at a high speed while improving the ride comfort of the passenger at the curved section in the guideway transportation system guided by the guideway at the time of running.

REFERENCE SIGNS LIST

1 Guideway vehicle
2, 2A, 2B Bogie
3 Body
4 Suspension frame
4a Receiving portion
5 Traction rod
10 Axle
10a Receiving portion
10b Receiving portion
11 Running wheel
12 Chassis
13 Guide device
14 Steering device
15 Tilting device
16 Bolster spring
21 Kingpin
22 Attachment shaft
25 Guide frame
25a Connection portion
26 Vertical beam
27 Horizontal beam
30 Guide wheel
31 Turning bearing
34 Steering arm
35 Steering rod
41 Bolster spring receiver
42 Hanging link member
43 Tilt guide member
44 Rod portion
45 Rod support portion
46 Elastic member
48 Hanging link member
51 Height adjustment valve
56 Air spring
61 Hanging link member
62 Adjusting rod
64 Support portion
65 Link body
66 Connecting rod
67 Main body
68 Protrusion portion 69 Pin
72, 72A Bogie
75 Tilting device
100 Guideway
101 Curved section
102 Road surface
120 Guide rail
O Turning axis
d Distance
θ Slip angle
L Length

The invention claimed is:

1. A bogie comprising:
running wheels to be rolled on a road surface of a guideway;
an axle which is installed on a lower part of a body of a guideway vehicle and to which the running wheels are attached;
a chassis supporting the axle;
a guide device which is configured to be guided by the guideway and is installed on the chassis so as to be capable of turning around a turning axis extending in a vertical direction;
a steering device which is configured to steer the running wheels in response to a turning movement of the guide device when the guide device is turned along a curved section of the guideway;
a tilting device which is connected to the guide device and which is configured to generate a tilting force of directing one side of the body located at an outside of the curved section upward with respect to the other side of the body located at an inside of the curved section in response to the turning movement of the guide device; and
a bolster spring supporting the body of the guideway vehicle from below,
wherein the tilting device includes:
a bolster spring receiver supporting the bolster spring from below;
a pair of first hanging link members each of which is installed such that an upper portion of the first hanging link member is connected to one of the axle and the bolster spring receiver with being capable of rotating around a first rotation axis extending in a running direction of the guideway vehicle, and a lower portion of the first hanging link member is connected to the other of the axle and the bolster spring receiver with being capable of rotating around a second axis extending on the running direction of the guideway vehicle, wherein the pair of first hanging link members are separated away from each other in a width direction of the bogie and are inclined such that a distance between the pair of first hanging link members in the width direction is increased toward a bottom of the bogie from a top; and
a tilt guide member through which the guide device is connected to the body and which is configured to be capable of generating the tilting force by transmitting a turning force of the guide device to the body as a force directed in the width direction at a connection portion between the guide device and the body.

2. The bogie according to claim 1, wherein the tilt guide member includes:
a rod portion which is connected to one of the body of the guideway vehicle and the guide device;
a rod support portion supporting the rod portion so as to be relatively movable in a direction of the rod portion and which is connected to the other of the body and the guide device; and
an elastic member which is installed in the rod support portion and which is configured to apply a force to the rod portion so as to bring the body and the guide device into a former relative position thereof when the guide device is turned.

3. The bogie according to claim 1, wherein the tilt guide member is configured to connect the guide device to a suspension frame installed on the body of the guideway vehicle so as to connect the chassis to the body.

4. The bogie according to claim 1, wherein the axle includes attachment shafts which are configured to allow the running wheels to be attached thereto and to rotate around a center axis in the vertical direction corresponding to a steering axis of the running wheels along with the running wheels,
wherein the steering device includes:
a pair of steering arms extending from the attachment shaft in the running direction and which are each rotatable around the center axis of the attachment shaft in accordance with the steering of the running wheels, and
a steering rod which is configured to connect each of the pair of steering arms to the connection portion of the guide device and is rotatable around the center axis in the vertical direction with respect to the guide device and the steering arm,
wherein a distance between the turning axis and the connection portion in the running direction is longer than a length of the steering arm.

5. A guideway vehicle comprising:
the bogie according to claim 1; and
a body which is supported from below by the chassis.

6. A bogie comprising:
running wheels to be rolled on a road surface of a guideway;
an axle which is installed on a lower part of a body of a guideway vehicle and to which the running wheels are attached;
a chassis supporting the axle;
a guide device which is configured to be guided by the guideway, is installed on the chassis so as to be capable of turning around a turning axis extending in a vertical direction, and includes a guide frame;
a steering device which is configured to steer the running wheels in response to a turning movement of the guide device when the guide device is turned along a curved section of the guideway;
a tilting device which is connected to the guide device and which is configured to generate a tilting force of directing one side of the body located at an outside of the curved section upward with respect to the other side of the body located at an inside of the curved section in response to the turning movement of the guide device;
a pair of air springs which are separated away from each other in a width direction of the bogie and which support the body of the guideway vehicle from below as a bolster spring; and
height adjustment valves which are configured to supply air to the pair of air springs and discharge air from the pair of air springs,
wherein the tilting device includes:
a second hanging link member which is connected to the guide device and which is supported such that one end portion of the second hanging link member located at an outside of the curved section is raised upward with respect to the other end portion of the second hanging link member located at an inside of the curved section in response to the turning movement of the guide device; and a pair of adjusting rods which are installed such that one of the pair of adjusting rods connects one end portion of the second hanging link member to one of the height adjustment valves and the other connects the other end portion of the second hanging link member to the other of the height adjustment valves, wherein the second hanging link member includes a support portion which is fixed to the guide frame, a link main body which is disposed so as to intersect the support portion and extends in the width direction of the bogie, and a connecting rod which connects the link main body to the support portion, the link main body includes a main body which extends in the width direction of the bogie and a protrusion portion which extends upward at a center position of the main body in the width direction of the bogie and forms an inverse T-shape when viewed from a running direction, the support portion extends upward in the vertical direction from a horizontal beam together with the horizontal beam of the guide frame, and is disposed at a position displaced in the width direction of the bogie from the center position in the width direction of the main body, the connecting rod extends in a width direction and connects an upper end of the support portion to the upper end of the protrusion portion, and the second hanging link member is operated by the turning movement of the guide frame, and wherein air is supplied to the air spring via the height adjustment valve when the adjusting rod is raised, the air is discharged from the air spring via the height adjustment valve when the adjusting rod is lowered.

\* \* \* \* \*